(12) United States Patent
Yang (10) Patent No.: US 8,363,439 B2
(45) Date of Patent: Jan. 29, 2013

(54) EFFICIENCY IMPROVEMENT IN POWER FACTOR CORRECTION

(75) Inventor: Zaohong Yang, Richardson, TX (US)

(73) Assignee: Flextronics AP, LLC, Broomfield, CO (US)

(*) Notice: Subject to any disclaimer, the term of this patent is extended or adjusted under 35 U.S.C. 154(b) by 771 days.

(21) Appl. No.: 12/107,321

(22) Filed: Apr. 22, 2008

(65) Prior Publication Data

US 2009/0262562 A1    Oct. 22, 2009

(51) Int. Cl.
*H02M 5/42* (2006.01)
*H02M 7/04* (2006.01)
*H02M 7/68* (2006.01)

(52) U.S. Cl. ......................................................... 363/89

(58) Field of Classification Search .............. 363/21.11, 363/21.13, 21.08–21.18, 84, 89
See application file for complete search history.

(56) References Cited

U.S. PATENT DOCUMENTS

| 4,353,112 A * | 10/1982 | Rietveld et al. | 363/86 |
| 6,944,034 B1 * | 9/2005 | Shteynberg et al. | 363/21.13 |
| 7,821,237 B2 * | 10/2010 | Melanson | 323/222 |
| 2006/0002155 A1 * | 1/2006 | Shteynberg et al. | 363/21.12 |

\* cited by examiner

*Primary Examiner* — Jue Zhang
(74) *Attorney, Agent, or Firm* — Marsh Fischmann & Breyfogle LLP (57) ABSTRACT

An power converter that is operable to convert AC power into DC power that may be delivered to a load. The power converter includes a transformer and a controllable switch. The switching frequency of the power converter is configured to be dependent on the level of the AC voltage of an AC power source. The switching frequency may be proportional to the AC voltage to provide a constant magnetic flux density swing for the transformer in the power converter. The switching frequency may be controlled by using a circuit that converts the AC voltage from the AC power source into a frequency signal that is proportional to the AC voltage.

24 Claims, 7 Drawing Sheets

EFFICIENCY IMPROVEMENT IN POWER FACTOR CORRECTION

BACKGROUND

Electronic devices such as notebook computers, desktop computers, monitors, and the like typically receive power from an AC power source. However, in most instances, the devices require DC power to operate, so the power from the AC power source must be converted to DC power. The simplest way to accomplish this is by diode rectification circuitry. In this type of circuit, diodes are positioned in a circuit so that AC current flows in only one direction, so that the output of the rectifier maintains a non-negative voltage. This method is typically the least expensive AC-DC conversion scheme, but it also creates the most noise or "pollution" on the AC power network. Such pollution occurs when a power converter is coupled to a load that is not purely resistive (e.g., reactive loads that include capacitors and inductors), causing the current drawn from the AC power source to be out of phase with the AC voltage, which may lead to increased harmonics and other undesirable effects. Therefore, if used in large numbers, devices that use this method can greatly impact the quality of the AC power line. Additionally, reactive loads cause power converters to be less efficient. Energy stored in the reactive loads results in a time difference between the current and voltage waveforms. This stored energy returns to the power source and is not available to do work at the load, so the "real power" of the circuit is less than the "apparent power." The ratio of real power to apparent power is generally referred to as the power factor of a circuit. As can be appreciated, a circuit with a low power factor will draw greater current to transfer a given quantity of real power than a circuit with a high power factor, which translates to increased losses in power distribution systems and increased energy costs. Hence, it is desirable to provide AC-to-DC power conversion that does not have these same shortcomings.

To achieve this, a power converter that includes power factor correction (PFC) circuitry may be used. Generally, PFC circuits seek to maintain the AC current substantially in phase with the AC voltage, so that the power converter resembles a purely resistive load to the AC power source, which reduces the pollution on the AC power line and increases the efficiency of the power converter. One type of PFC circuit is generally referred to as a passive PFC circuit. Passive PFC circuits perform power factor correction with only passive components, such as inductors and capacitors. Passive PFC circuits are typically robust and effective, but it is often difficult to reduce the distortion to acceptable levels. Furthermore, since passive PFC circuits operate at the relatively low line frequency (e.g., 50 Hz or 60 Hz), the inductors and capacitors required may be large in size and costly.

Another type of PFC circuit is generally referred to as an active PFC circuit. Active PFC circuits generally have at least one power switch, and power converters that include them may be referred to as switching power converters. Switching power converters offer both compactness and efficiency in a number of different topologies that can be placed into two main categories: isolated and non-isolated converters. In non-isolated switching power converters, such as buck (reducing voltage) or boost (increasing voltage) converters, the power output is directly coupled to the power input through a power switch. In contrast, in isolated power converters, such as flyback or forward converters, the power output is isolated from the power input through a transformer, with the power switch being located on the primary (input) side of the transformer, and the load being located on the secondary side of the transformer.

Figure 1:
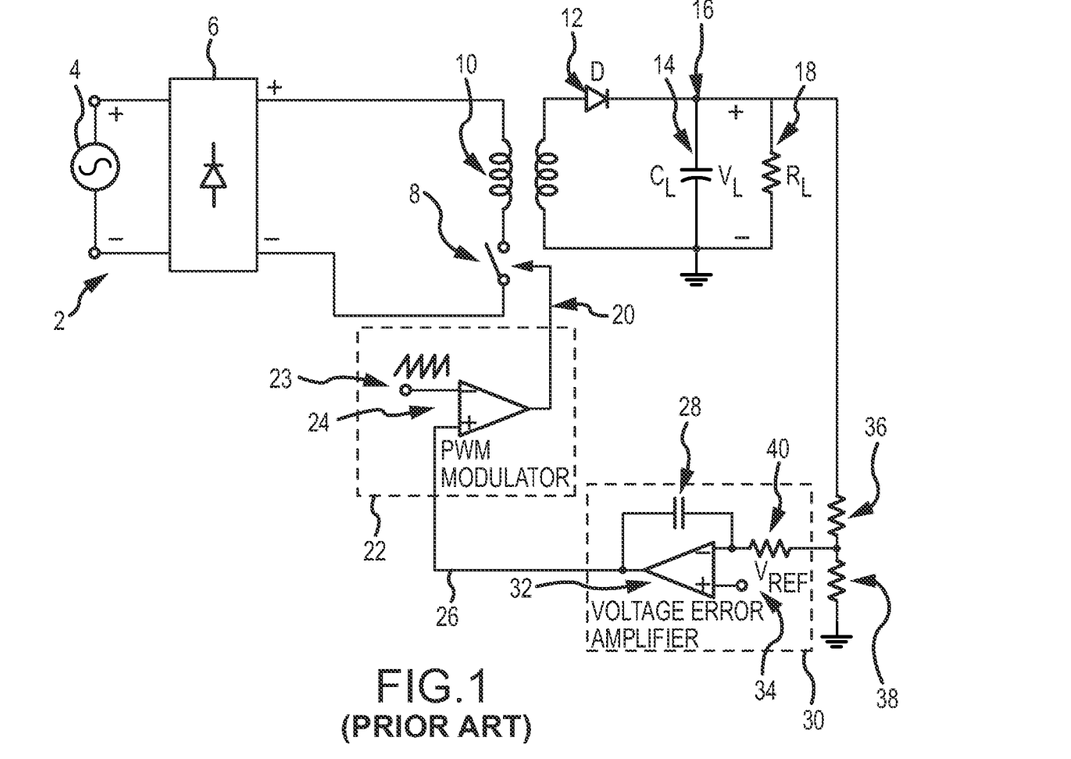
FIG. 1 is a schematic diagram of a power converter of the prior art.

An example of a prior art flyback power converter 2 is illustrated in FIG. 1. The power converter 2 includes a power switch 8 (typically a field effect transistor), coupled to an AC power source 4 through a rectifier 6 and the primary winding of a transformer 10. A rectifying diode 12 and a bulk capacitor 14 are coupled to the secondary winding of the transformer 10. When the power switch 8 is closed (i.e., the charging stage), current flows from the AC power source 4 through the primary winding of the transformer 10, and energy is stored in the transformer's magnetic field. Then, when the power switch 8 is opened (i.e., the discharging stage), the current flow from the AC power source 4 is interrupted, causing the magnetic field to collapse, which in turn causes a reversal in the direction of the magnetic field flux change. The negative flux change induces a voltage in the opposite direction from that induced during the charging stage. The term "flyback" originates from the induced voltage reversal that occurs when the AC power source 4 current is interrupted. The reversed induced voltage tries to induce a current flow through the primary winding of the transformer 10, but the open power switch 8 prevents current from flowing. With the voltage reversed, the rectifying diode 12 is now forward biased and permits current flow through it. This current flows into the bulk capacitor 14 where it may be used to drive a load 18.

By controlling the duration of the charging stage, the voltage at an output node 16 of the power converter 2 may be regulated. The regulation of the output voltage of power converter 2 may generally be accomplished by including a voltage error amplifier (VEA) 30 for sensing the difference between an output voltage feedback signal that approximates the output voltage at the load 18, and a reference voltage, and by using this difference (i.e. error voltage) to determine how to cycle the power switch 8 so as to minimize the difference. In this regard, the VEA 30 includes a comparator 32 that has an inverting input coupled to the output node 16 through a resistor 40 and a voltage divider that includes two resistors 36, 38. Furthermore, a feedback capacitor 28 may be coupled between the inverting input and output of the comparator 32 to provide for stability. The reference voltage 34 is coupled to the non-inverting input of the comparator 32, so that the output node 26 of the comparator 32 will be driven high when the output voltage feedback signal is less than the reference voltage 34. The power converter 2 also includes a pulse width modulation (PWM) controller 22 that outputs a drive signal on a switch control node 20 to open and close the power switch 8. The PWM controller 22 uses the output node 26 of the VEA 30 to form pulses that will cycle the power switch 8 in such a way as to drive the output voltage feedback signal toward the reference voltage 34. More specifically, the PWM controller 22 receives a constant frequency oscillating signal on its inverting input 23, and the output node 26 of the VEA 30 on its non-inverting input, and adjusts the duty cycle (i.e., the ratio of time that the switch 8 is closed to the switching period) of the switch control node 20 so that the output voltage feedback signal, at the inverting input, will substantially track the reference voltage 34, which functions to maintain the output node 16 of the power converter 2 at a desired level.

As discussed above, it is becoming increasingly important that power converters operate as efficiently as possible. For example, in an effort to reduce energy consumption and greenhouse gas emissions produced by power plants, the Energy Star program was developed. Generally, the Energy Star program provides incentives to manufacturers to comply with strict power consumption guidelines. For example, effective Jul. 20, 2007, power converters will be required to operate at 80% efficiency or higher for loads that range from 20% to 100% of the power converter's rated load. Additionally, power converters will be required to operate at a power factor of greater than 0.9 at loads that are at 100% of the rated load to receive the Energy Star designation.

In order to meet these and other specifications, it may be desirable to improve the efficiency of power converters. In addition to efficiency losses associated with a low power factor, the main transformer (e.g., the transformer 10) of isolated switching power converters is also a source of power loss. First, there is power lost due to the resistance of the wire windings. Unless superconducting wires are used, there will always be power dissipated in the form of heat through the resistance of current-carrying conductors. Because transformers may require relatively long lengths of wire, this loss can be a significant factor. Increasing the gauge of the winding wire is one way to minimize this loss, but only with undesirable increases in cost, size, and weight.

In addition to resistive losses, the bulk of transformer power loss is due to magnetic effects in the core. Perhaps the most significant of these core losses is eddy-current loss, which is resistive power dissipation due to the passage of induced currents through the magnetic core. Because the core is a conductor of electricity as well as being a "conductor" of magnetic flux, there will be currents induced in the core just as there are currents induced in the secondary windings from the alternating magnetic field. These induced currents tend to circulate through the cross-section of the core perpendicularly to the primary winding turns. Their circular motion gives them their unusual name: like eddies in a stream of water that circulate rather than move in straight lines. Core materials are typically fair conductor of electricity, but not as good as the copper or aluminum from which wire windings are typically made. Consequently, these "eddy-currents" must overcome significant electrical resistance as they circulate through the core. In overcoming this resistance, they dissipate power in the form of heat. Hence, the eddy-currents create a source of inefficiency in the transformer that is difficult to eliminate.

Another transformer power loss associated with the magnetic core is that of magnetic hysteresis. All ferromagnetic materials tend to retain some degree of magnetization after exposure to an external magnetic field. This tendency to stay magnetized is called hysteresis, and it takes a certain investment in energy to overcome this opposition to change every time the magnetic field produced by the primary winding changes polarity (i.e., twice per AC cycle).

Transformer energy losses tend to worsen with increasing frequency. First, a phenomenon known as the "skin effect" is a factor. The skin effect is the tendency of an AC current to distribute itself within a conductor so that the current density near the surface of the conductor is greater than that at its core. That is, the electric current tends to flow at the "skin" of the conductor. This effect is amplified with increasing frequencies, which reduces the available cross-sectional area for electron flow, thereby increasing the effective resistance as the frequency goes up and creating more power lost through resistive dissipation. Magnetic core losses are also increased with higher frequencies, due to the eddy currents and hysteresis effects becoming more severe. Further, energy losses in transformers tend to worsen with increased voltage on the primary windings, due to the corresponding increases in magnetic flux density swings.

It is against this background that the power converter described herein has been developed.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, power converter is provided that is capable of receiving AC power from an AC power source on an input terminal and delivering DC power to a load on an output terminal. The power converter includes a rectifier having an input terminal coupled to the AC power source, and an output terminal, the rectifier being operable to receive an AC voltage on its input terminal and deliver a rectified voltage on its output terminal. The power converter further includes a converter stage having an input terminal coupled to the output terminal of the rectifier, and an output terminal coupled to the output terminal of the power converter, the converter stage including a controllable switch that is operable to open and close in response to a drive signal, and a transformer that is coupled to the controllable switch. Additionally, the power converter includes a drive signal control circuit that is coupled to the controllable switch, wherein the drive signal control circuit is operable to switch the drive signal at a frequency that is dependent upon the magnitude of the AC voltage of the AC power source.

According to a second aspect, a method for use in a power converter is provided, the power converter being operable to receive AC power from an AC power source on an input terminal and deliver DC power to a load on an output terminal. The method includes converting an input AC voltage to a rectified voltage. The method further includes supplying the rectified voltage to a converter stage that includes a controllable switch that is operable to open and close in response to a drive signal, and a transformer that is coupled to the controllable switch. Additionally, the method includes controlling the drive signal, wherein the drive signal switches at a frequency that is dependent upon the magnitude of the AC voltage of the AC power source.

According to a third aspect, a switching power converter is provided. The power converter includes a magnetic storage device coupled to an input power source, and an output capacitor coupled to the magnetic storage device. The power converter further includes a switch element coupled to the magnetic storage device. Additionally, the power converter includes a switch control element that is operable to cycle the switch element at a rate that is proportional to the RMS voltage of the input power source.

In addition to the exemplary aspects and embodiments described above, further aspects and embodiments will become apparent by reference to the drawings and by study of the following descriptions.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 2:
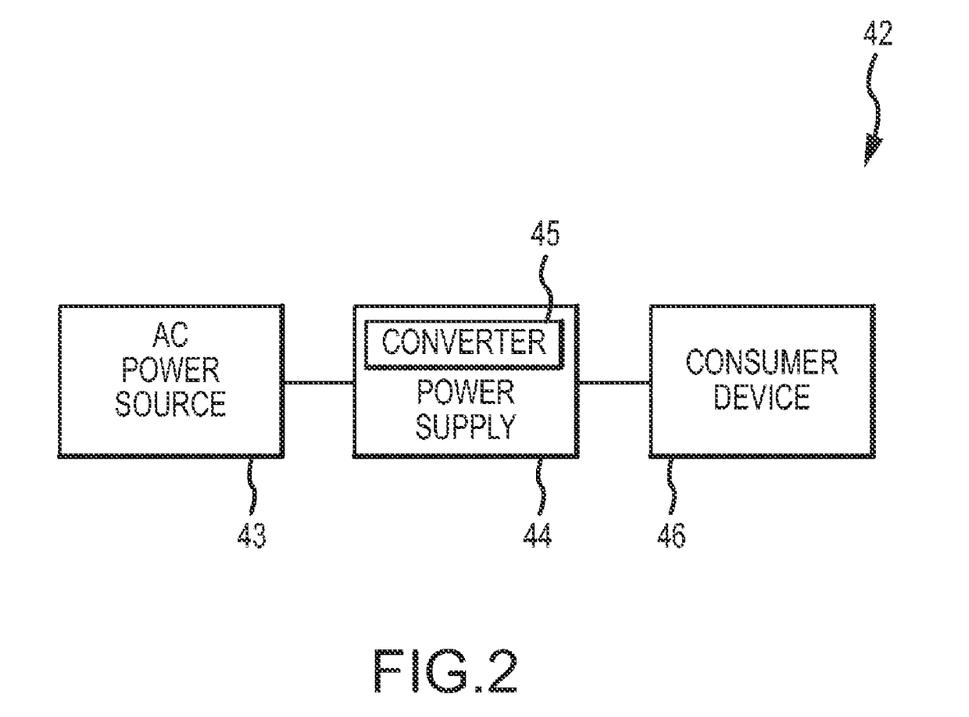
FIG. 2 is a block diagram of an application that uses a power converter.

FIG. 2 illustrates an exemplary application 42 for a power converter 45. As shown, the power converter 45 may be incorporated as a component in a power supply 44 for a consumer device 46. The consumer device 46 may be a portable computing device (e.g., a notebook computer, a personal digital assistant, a tablet PC, or the like), or a desktop computer, mobile telephone, portable music player, or the like. The power supply 44 may function to modify the output from an AC power source 43 to a form that is suitable for the consumer device 46 (e.g., converting AC power into DC power). As discussed above, the power converter 45 may increase the power factor to an acceptable level for a particular application. Furthermore, it may be desirable that the power converter 45 operates at a high efficiency.

In several applications, it may be desirable to operate a power converter in what is generally referred to as discontinuous conduction mode (DCM). In DCM, the current in the rectifying diode (i.e., the rectifying diode 12 shown in FIG. 1) goes to zero during a portion of every switching cycle. Although DCM may be suitable for relatively lower power applications, it generally provides a simpler control design and faster transient responses. For example, the control of a conventional DCM flyback converter functioning as a power factor correction circuit employs essentially a constant duty cycle for the power switch (e.g., the power switch 8 shown in FIG. 1). That is, the duty cycle of the power switch does not change significantly over a cycle of the AC power source. When a converter (e.g., a flyback converter, boost converter, single ended primary inductor converter (SEPIC converter), forward converter, or the like) is operated in DCM, the envelope of the peak value of the input current will follow the waveform of the input voltage when the duty cycle is kept constant. If an input differential filter is included, the input current pulsating waveform is averaged every switching cycle. As a result, the input current is a sinusoidal waveform that follows the input voltage, which causes the converter to have a high power factor. Additionally, the switching frequency of the power switch may be kept substantially constant for a power converter operating in DCM.

When designing a power converter to operate in DCM, consideration must be given to avoid magnetic saturation. Magnetic saturation occurs when the flux density of the core of the transformer reaches its maximum. When this occurs, any further increases in magnetic force (e.g., increases in current or voltage in the conductors) will not increase the flux density, which causes the core to fail to behave as a transformer. To avoid this undesirable behavior, power converter designers must ensure that the swing in flux density of the transformer is less than the saturation level for the particular magnetic core material and shape. The root-mean-square (RMS) of the flux density swing ($\Delta B_{rms}$) for a transformer can generally be represented by the following equation:

$$\Delta B_{rms} = \frac{V_{INrms} \times d}{N \times A_e \times f_{sw}} \quad (1)$$

where $V_{INrms}$ is the RMS value of the AC input voltage, d is the duty cycle of the power switch, N is the number of primary turns of coil in the transformer, $A_e$ is the cross sectional area of the magnetic core, and $f_{sw}$ is the switching frequency of the power switch. In typical applications where an isolated power converter is operating in DCM for power factor correction, all of the variables in Equation (1) remain constant when the power converter is in operation, except for $V_{INrms}$, which may vary depending on the specific AC power source that the power converter is coupled with (e.g., $120V_{INrms}$ in the United States, $230V_{INrms}$ in the United Kingdom, etc.). Since the flux density swing ($\Delta B_{rms}$) is proportional to the AC input voltage ($V_{INrms}$), power converter designers must choose the variables d, N, $A_e$, and $f_{sw}$ such that the flux density swing ($\Delta B_{rms}$) does not saturate under the highest input voltage ($V_{INrms}$) that the power converter is designed to work with. In practice, this means that the switching frequency ($f_{sw}$), which is inversely proportional to the flux density swing ($\Delta B_{rms}$), must be designed to be great enough so that the transformer does not saturate at the highest potential input voltage ($V_{INrms}$).

The inventor has recognized that the switching frequency ($f_{sw}$) chosen to accommodate the condition when the power converter is coupled to a relatively high input voltage source (e.g., $264V_{INrms}$) is unnecessarily high when the power converter is coupled to a lower input voltage source (e.g., $85V_{INrms}$). This is undesirable as various power losses of the power converter are increased as the switching frequency ($f_{sw}$) is increased. For example, power loss associated with the power switch (e.g., the power switch 8 in FIG. 1) is directly proportional to the switching frequency ($f_{sw}$). The core loss of the transformer is also proportional to the switching frequency ($f_{sw}$). Further, as discussed above, the "skin effect" in the conductors of the transformer is worsened at higher switching frequencies.

The increases in power losses due to higher switching frequencies become especially detrimental at low line voltages, where the current drawn from the AC power source may be increased to provide sufficient power to a load. To solve this problem, a novel system and method are presented that include a switching frequency ($f_{sw}$) that is dependent upon the RMS value of the AC input voltage ($V_{INrms}$). For example, in one embodiment the switching frequency ($f_{sw}$) may be configured to be proportional to the AC input voltage ($V_{INrms}$). Since the switching frequency ($f_{sw}$) can be lower at relatively low AC input voltages without causing the transformer to saturate, the losses associated with the power switch and transformer losses may then be reduced for lower AC input voltages, which has the effect of improving the efficiency of the power converter.

When the switching frequency ($f_{sw}$) is made to be proportional to the RMS value of the AC input voltage ($V_{INrms}$), the RMS value of the flux density swing ($\Delta B_{rms}$) will be constant throughout all of the operating AC line voltages, as illustrated by the following equations:

$$f_{sw} = C_2 \times V_{INrms} \quad (2)$$

where $C_2$ is a constant. Therefore, by inserting $f_{sw}$ from Equation (2) in to Equation (1), the flux density swing ($\Delta B_{rms}$) may be represented as $$\Delta B_{rms} = \frac{d}{N \times A_e \times C_2} \quad (3)$$

Figure 3:
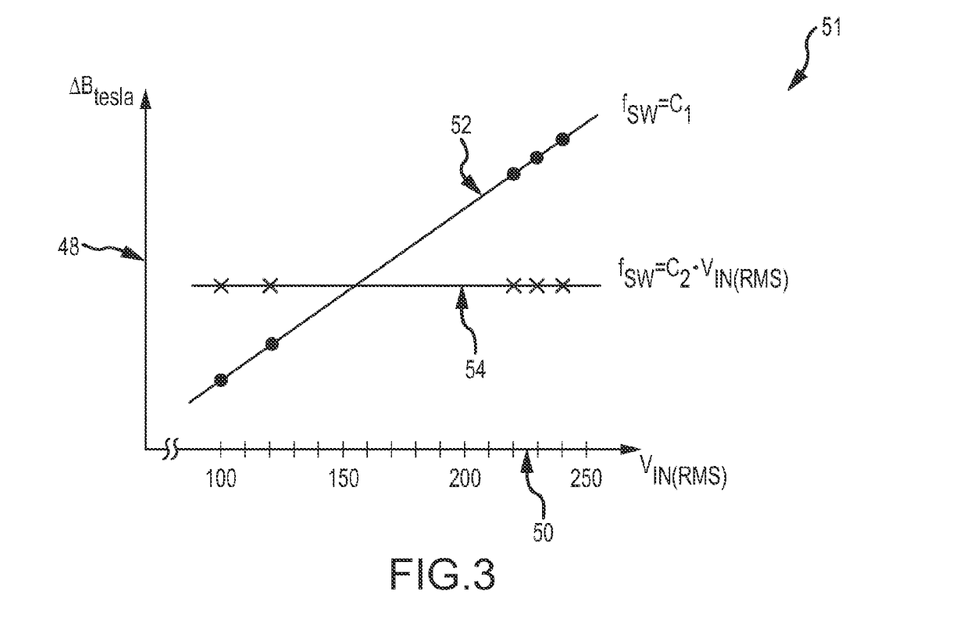
FIG. 3 is a graph of the magnetic flux density versus input voltage for a prior art power converter and an exemplary power converter.

As can be seen from Equation (3), the flux density swing ($\Delta B_{rms}$) is constant for all AC input voltages (i.e., the flux density swing is independent of AC input voltage). This feature is generally illustrated in FIG. 3, which shows a graph 51 of flux density swing ($\Delta B_{rms}$) (the vertical axis 48) versus AC input voltage ($V_{INrms}$) (the horizontal axis 50) for a constant switching frequency (a line 52) and a switching frequency that is proportional to the AC input voltage (line 54). The data points shown are a sampling of voltages from various countries of the world (e.g., $120V_{rms}$ in the United States, $230V_{rms}$ in the United Kingdom, etc.). The graph 51 illustrates that when the switching frequency ($f_{sw}$) is made to be proportional to the AC input voltage ($V_{INrms}$), the flux density swing ($\Delta B_{rms}$) is constant throughout the range of input voltages. As can be appreciated, this is desirable because the power converter may be designed to operate more efficiently at low AC input voltages, while still not causing the transformer to saturate at high AC input voltages.

Figure 4:
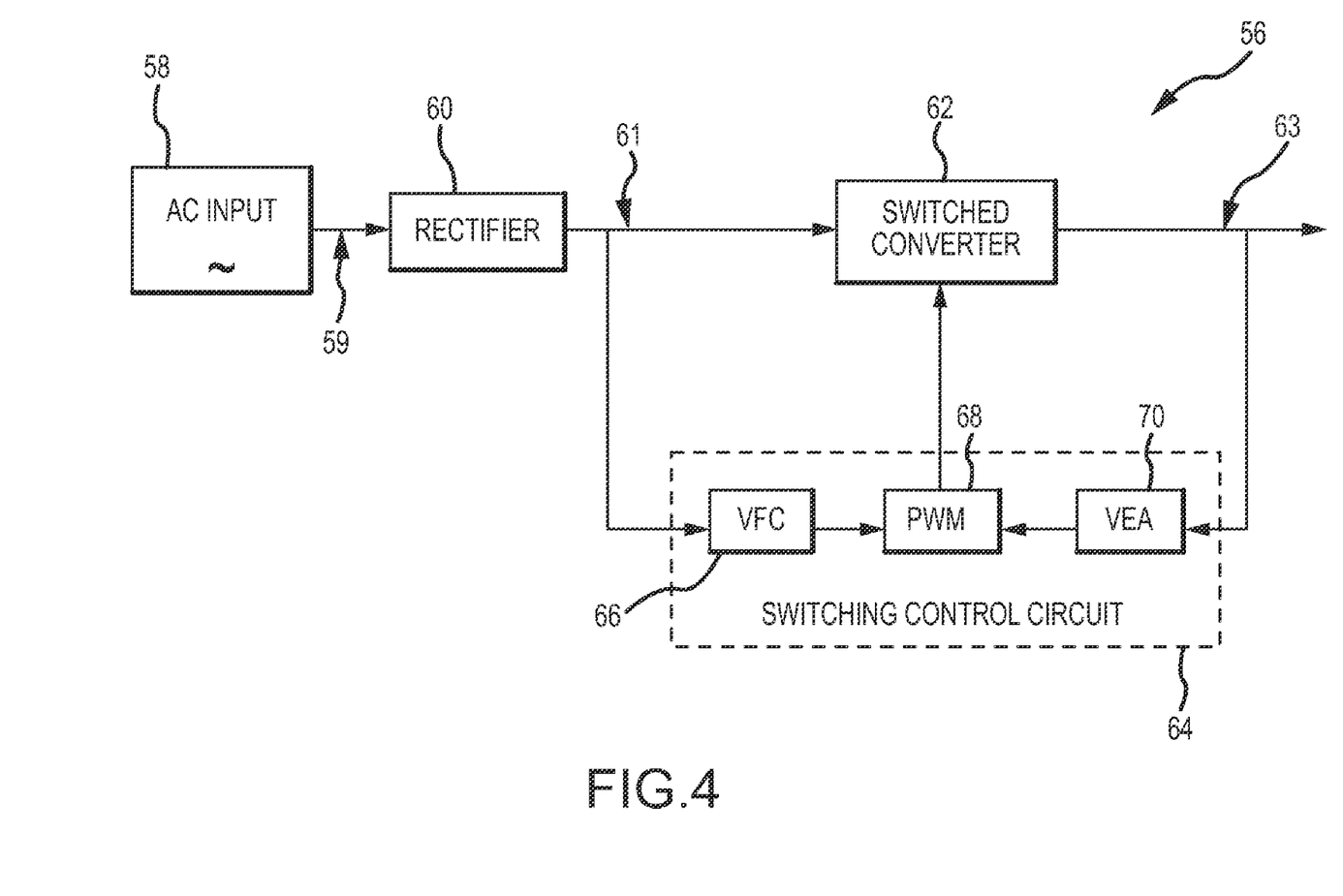
FIG. 4 is a block diagram of an exemplary power converter.

Turning now to FIG. 4, a block diagram of an exemplary power converter 56 is illustrated. The power converter 56 may include a switched converter 62 that is coupled to an AC power source 58 through a rectifier 60. The rectifier 60 may be any circuit that is operable to convert AC current into current with only a positive value. As an example, the rectifier 60 may include a diode bridge. Further, the switched converter 62 may be any switched converter that includes a controllable switch. Examples of such converters include flyback and forward type converters (e.g., single-switch or double-switch forward type converters), Boost converters, SEPIC converters, Ćuk converters, etc. Those having ordinary skill in the art will readily recognize the various types of isolated switched converters or non-isolated switched converters that are suitable for use in the power converter 56.

To provide control to the switched converter 62, a switching control circuit 64 may be provided. The switching control circuit 64 may include a voltage error amplifier (VEA) 70, a PWM controller 68, and a voltage-to-frequency converter (VFC) 66. The VEA 70 may be coupled to an output node 63 of the power converter 56 to sense the instantaneous voltage at that point. The VEA 70 may be operable to compare the output voltage with a reference voltage, and to provide corresponding feedback to the PWM 68.

The VFC 66 may be operable to sense the voltage at an output node 61 (or an input node 59) of the rectifier 60, and to convert that voltage into a corresponding frequency. This frequency may then be provided to the PWM controller 68, so that the PWM controller may drive a power switch in the switched converter 62 at that frequency. As can be appreciated, the VFC 66 may be any circuit that is suitable for converting a voltage to a frequency. For example, a commercially available integrated circuit may be used to perform this function, such as an LM331 integrated circuit manufactured by National Semiconductor Corporation. Additionally or alternatively, a custom circuit may be implemented. An example of a custom VFC circuit is described below in reference to FIG. 7.

Figure 5:
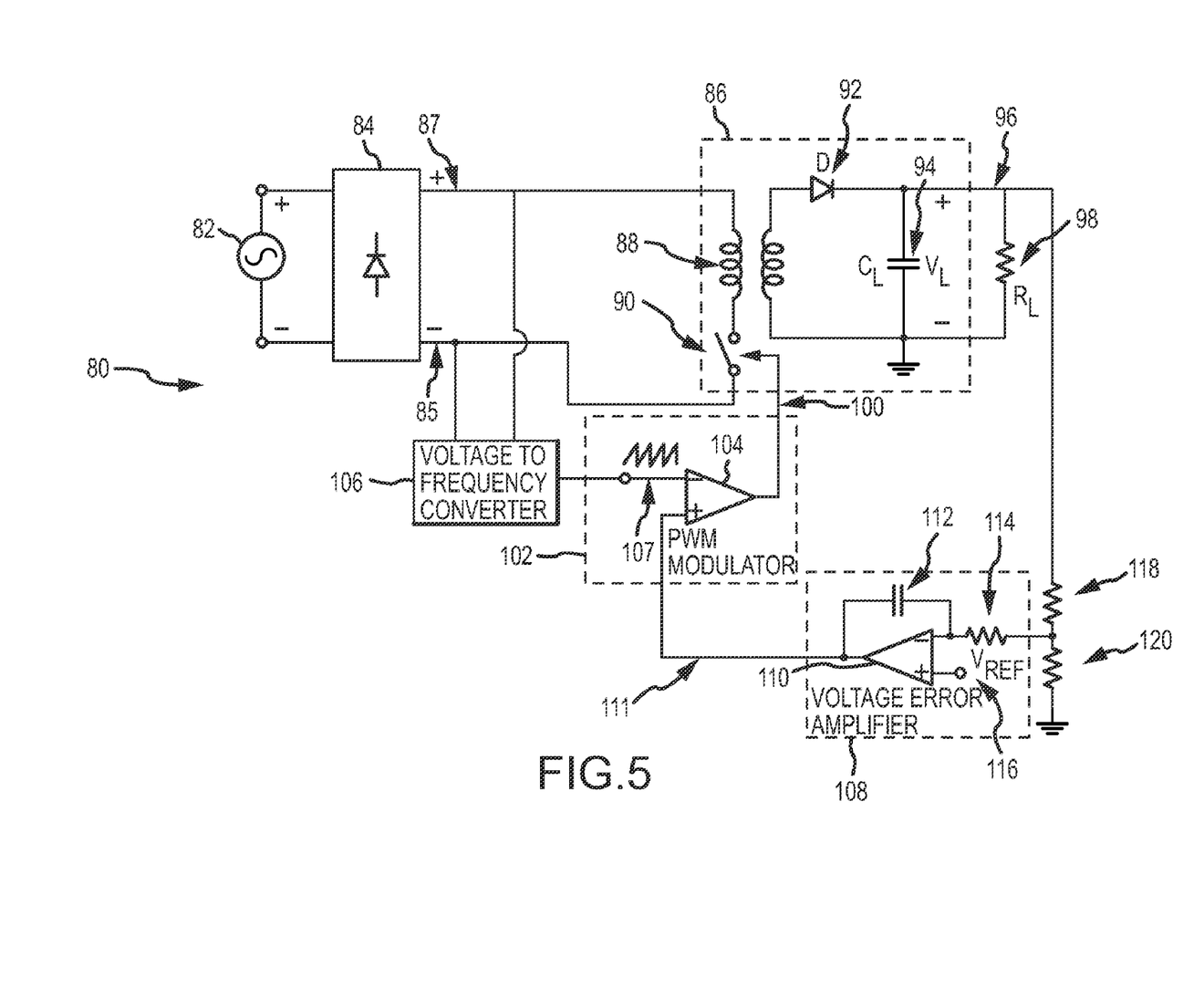
FIG. 5 is a schematic diagram of an exemplary power converter.

FIG. 5 illustrates a schematic of an exemplary power converter 80 that implements a flyback topology. The power converter 80 includes a power switch 90, coupled to an AC power source 82 through a rectifier 84 and the primary winding of a transformer 88. A rectifying diode 92 and a bulk capacitor 94 are coupled to the secondary winding of the transformer 88. When the power switch 90 is closed (i.e., the charging stage), current flows from the AC power source 82 through the primary winding of the transformer 88, and energy is stored in the transformer's magnetic field. When the power switch 90 is opened (i.e., the discharging stage), the current flowing from the AC power source 82 is interrupted, causing the magnetic field to collapse, which causes a reversal in the direction of the magnetic field flux change. The negative flux change induces a voltage in the opposite direction from that induced during the charging stage, which is the effect generally known as "flyback." The reversed induced voltage tries to induce a current flow through the primary winding of the transformer 88, but the open power switch 90 prevents current from flowing. With the voltage reversed, the rectifying diode 92 is now forward biased and permits current flow through it. This current flows into the bulk capacitor 94 where it may be used to drive a load 98 that is connected to an output node 96 of the power converter 80.

By controlling the duration of the charging stage, the voltage at the output node 96 of the power converter 80 may be regulated. The regulation of the output voltage of power converter 80 may generally be accomplished by including a VEA 108 for sensing the difference between an output voltage feedback signal that relates to the output voltage at the load 98, and a reference voltage, and by using this "error voltage" to determine how to cycle the power switch 90 so as to minimize the difference. In this regard, the VEA 108 includes an operational amplifier 110 that has an inverting input coupled to the output node 96 of the power converter 80 through a resistor 114 and a voltage divider that includes two resistors 118, 120. Furthermore, a feedback capacitor 112 may be coupled between the inverting input and output of the operational amplifier 110 to provide for stability. A reference voltage 116 may be coupled to the non-inverting input of the operational amplifier 110, so that the output node 111 will be driven high when the output voltage feedback signal is less than the reference voltage 116. The power converter 80 may also include a PWM controller 102 that outputs a drive signal on a switch control node 100 to open and close the power switch 90. The PWM controller 102 may use the output node 111 of the VEA 108 to form pulses that will cycle the power switch 90 in such a way as to drive the voltage at the output node 96 of the power converter 80 toward the reference voltage 116. Moreover, the PWM controller 102 may receive an oscillating signal on its inverting input 107 from a VFC 106. The VFC 106 may be coupled to output terminals 85, 87 of the rectifier 84 so that the VFC may sense the RMS voltage from the AC power source 82. The VFC 106 may be configured to transform the sensed voltage into a corresponding frequency. As an example, the VFC 106 may output a frequency to the PWM controller 102 that is proportional to the RMS value of the sensed voltage. Using the oscillating signal from the VFC 106 and the voltage error signal from the output node 111 of the VEA 108, the PWM controller 102 may then control the power switch 90 at a corresponding frequency and duty cycle using a comparator 104. Those skilled in the art will readily recognize the operation of PWM controllers.

Figure 6:
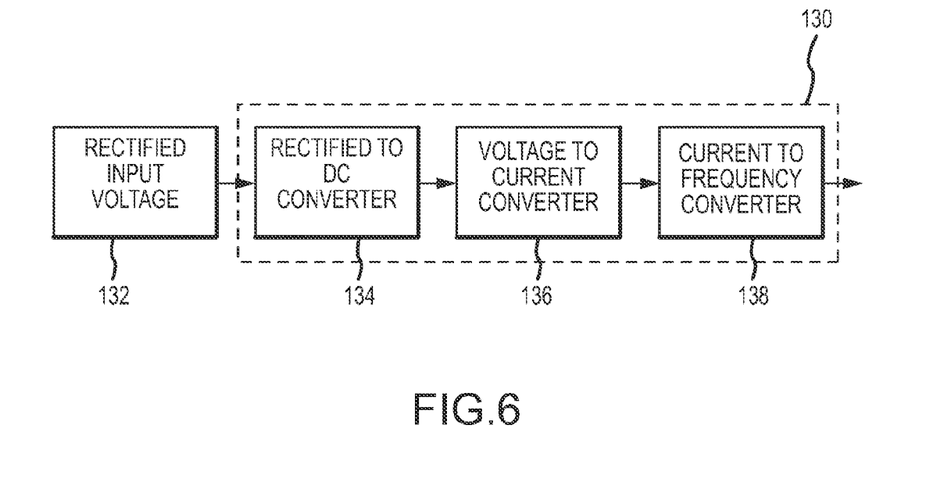
FIG. 6 is a block diagram of a voltage-to-frequency converter.

FIG. 6 illustrates a block diagram of an exemplary VFC 130. In this embodiment, the VFC 130 receives rectified voltage from a rectified input voltage source 132. The rectified input voltage source 132 may be, for example, a bridge rectifier circuit that is coupled to an AC power source. The VFC 130 may also include a rectified-to-DC voltage converter 134. The converter 134 may be a circuit that is operable to convert a rectified voltage into a DC voltage. As an example, the converter 134 may be a passive filter network that includes various capacitors, inductors, and resistors.

Alternatively, the converter 134 may be an active filter, a digital filter, or the like. The VFC 130 may also include a voltage-to-current converter 136 that is coupled to the converter 134. The converter 136 may be any circuit that is operable to convert a DC voltage into a corresponding current. For example, a current mirror source may be used. Additionally or alternatively, one or more operational amplifiers or other integrated circuits may be used to implement the voltage-to-current converter 136. The VFC 130 may also include a current-to-frequency converter 138 that is coupled to the converter 136. Similar to other components of the VFC 130, the converter 138 may be any circuit that is operable to convert a current received from the converter 136 to a frequency. For example, the converter 138 may include one or more operational amplifiers. Additionally, the converter 138 may include one or more custom or commercially available integrated circuits. Although specific circuitry (e.g., the converters 134, 136, 138) is described herein in relation to the VFC 130, it should be appreciated that the VFC 130 may generally include any circuitry that performs the function of converting a characteristic of an input voltage source (e.g., RMS voltage) to a corresponding frequency that may be used to control a switch in a power converter (e.g., the switch 90 shown in FIG. 5).

Figure 7:
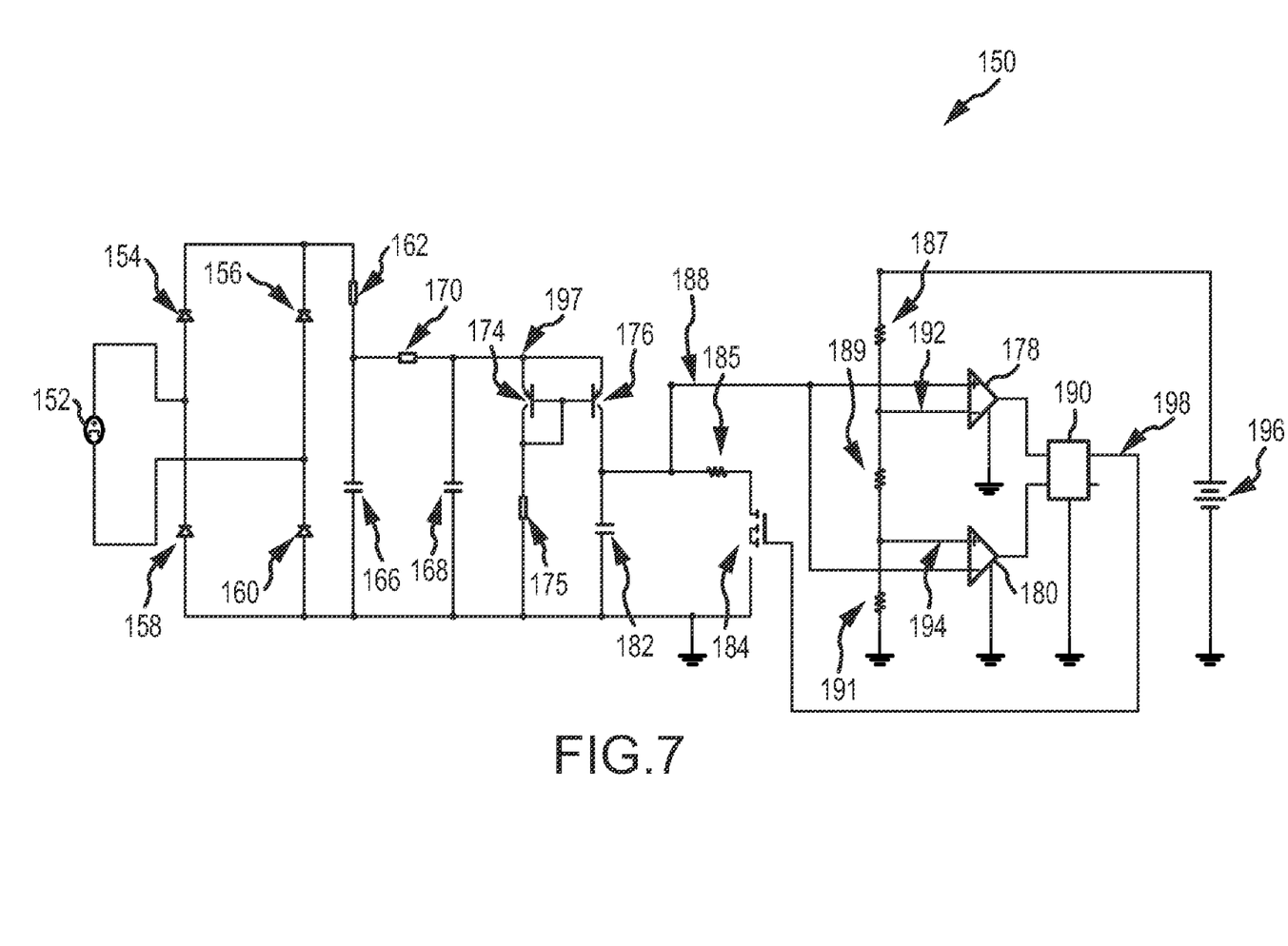
FIG. 7 is a schematic diagram of a voltage-to-frequency converter.

FIG. 7 illustrates an exemplary embodiment of a VFC 150 that may be included in a power converter, such as the power converter 56 shown in FIG. 4. Generally, the VFC 150 operates to sense the AC input voltage at an AC power source 152, and output a signal on a node 188 that has a frequency proportional to that voltage. The oscillating signal generated on the node 188 may then be coupled to a PWM controller (e.g., the PWM controller 68 shown in FIG. 4) to control the switching frequency of a power switch in a switched converter (e.g., the switched converter 62 shown in FIG. 4). The schematic shown in FIG. 7 is generally described from left to right. While specific components are described, these are merely examples, and it will be understood by a person having ordinary skill in the art that other components and different circuit arrangements may be used.

The VFC 150 may include a bridge rectifier that includes four diodes 154, 156, 158, 160 that are coupled to the AC power source 152. It is noted that the VFC 150 may also be coupled directly to the output of a rectifier, such as the rectifier 84 shown in FIG. 5, so that duplicate rectification circuitry (i.e., the diodes 154, 156, 158, 160) is not required. Next, the rectified AC voltage may be transformed into a DC voltage at a node 197 by passing through a low-pass passive filter network that includes two resistors 162, 170 and two capacitors 166, 168. It should be appreciated that the DC voltage at the node 197 will be proportional to the AC voltage of the power source 152. After the filter network, the DC voltage may be transformed into a corresponding current that is proportional to the DC voltage by implementing a current mirror source that includes two FETs 174, 176 and a resistor 175.

The VFC 150 may also include a sawtooth waveform generator that is operable to transform the current in the FET 176 to a sawtooth waveform at a node 188 that has a frequency that is proportional to the current, and ultimately proportional to the voltage of the AC power source 152. The sawtooth waveform generator may include a timing capacitor 182 that is charged by the current from the FET 176, which is substantially constant for a constant AC input voltage. Due to the constant current, the voltage across the capacitor (i.e. the node 188) rises linearly with time. To control the charging and discharging of the capacitor 182, the node 188 is coupled to a window comparator that includes an upper comparator 178 and a lower comparator 180. Additionally, an upper reference voltage 192 may be applied to the inverting pin of the upper comparator 178, and a lower reference voltage 194 may be applied to the non-inverting pin of the lower comparator 180. The reference voltages 192, 194 may be formed by a voltage divider that includes three resistors 187, 189, and 191 that are coupled between a DC power source 196 and ground. In one embodiment, the power source 196 has an output voltage of 12 volts, and the resistors 187, 189, and 191 are equal to each other. In this case, the upper reference voltage 192 is approximately 8 volts (i.e., two-thirds of 12 volts), and the lower reference voltage 194 is at approximately 4 volts (i.e., one-third of 12 volts). As is described in greater detail below, the timing capacitor 182 is charged to the upper reference voltage 192 and discharged to the lower reference voltage 194, in a manner that generates a sawtooth-shaped signal on the node 188.

The window comparator controls the charging and discharging cycles of the capacitor 182 by using an R-S flip-flop 190 coupled to the gate of a FET 184 that is coupled between the two terminals of the capacitor 182 (i.e., the node 188 and ground) through a discharging resistor 185. The output of the R-S flip-flop 190 is configured to control the operation of the FET 184. In operation, the FET 184 begins in an open position, which allows the current flowing from the FET 176 to charge the capacitor 182. When the voltage across the capacitor 182 reaches the upper reference voltage 192, the output of the upper comparator 178 is driven high. This in turn causes the R-S flip-flop 190 to close the switch 184, which begins rapidly discharging the capacitor 182 to ground through the resistor 185 and the FET 184. When the voltage across the capacitor 182 falls to the lower reference voltage 194, the output of the lower comparator 180 is driven high, which resets the R-S flip-flop 190 and turns off the FET 184. This permits the current from the FET 176 to recharge the capacitor 182 so that the voltage at the node 188 again rises linearly with time. This cycle is repetitive and generates the sawtooth waveform at the node 188, which may then be coupled to a PWM controller (e.g., the PWM controller 68 shown in FIG. 4) to control the switching frequency of a power switch in a switched converter (e.g., the switched converter 62 shown in FIG. 4). It should be appreciated that the frequency of the sawtooth waveform at the node 188 will be proportional to the AC input voltage of the power source 152. For example, when the AC input voltage is relatively low, the DC current that is used to charge the timing capacitor 182 is also low, which causes the voltage across the capacitor 182 (i.e., the voltage at the node 188) to rises slowly from the lower reference voltage 194 to the upper reference voltage 192. Therefore, the frequency of the sawtooth waveform is low. Similarly, when the AC input voltage is high, the DC current used to charge the timing capacitor 182 is also high, which causes the voltage across the capacitor 182 to rise relatively quickly, resulting in a proportionately higher frequency for the sawtooth waveform.

It should be appreciated that the power converter described herein has several benefits and advantages over previous designs. Namely, controlling the switching frequency to be dependent upon the voltage of the AC power source greatly improves the efficiency of the power converter for relatively low input voltages. As discussed above, the power losses associated with the main switch, the rectifying diode, and the transformer of a power converter are significantly reduced when the switching frequency is reduced at lower input voltages. Further, when the switching frequency is proportional to the input voltage, the flux density swing of the transformer is constant. This has the advantage of reducing or eliminating transformer saturation concerns when designing a power converter for a particular application.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. A switching power converter for converting power from an AC input power source to an output at a DC output voltage, comprising:
   a transformer having a primary winding coupled to the AC input power source;
   an output capacitor coupled to a secondary winding of the transformer;
   a switch element coupled to the primary winding of the transformer, the switch drawing input current from the AC power source through the primary winding of the transformer when the switch is closed and interrupting the input current from the AC power source when the switch is open; and
   a switch control circuit that is operable to cycle the switch element at a frequency that is proportional to the RMS voltage of the AC input power source,
   wherein an envelope of the input current pulsed waveform of the power converter is a sinusoidal waveform that follows an AC voltage of the AC input power source.

2. The power converter of claim 1, wherein the switch control circuit is operable to cycle the switch element at a frequency such that the RMS value of the flux density of the transformer is substantially constant for a range of magnitudes of AC voltage levels of the AC power source.

3. The power converter of claim 2, wherein the range of magnitudes of AC voltage levels of the AC power source is approximately between 80 and 400 volts RMS.

4. The power converter of claim 1, wherein the switch control circuit includes a voltage-to-frequency converter that is operable to cycle the switch element at a frequency that is dependent upon the magnitude of the AC voltage.

5. The power converter of claim 4, further comprising a rectifier operable to convert the AC input voltage into a rectified voltage, wherein the voltage-to-frequency converter includes:
   a filter having an input terminal coupled to the rectifier, and an output terminal, the filter operable to convert the rectified voltage into a DC voltage;
   a voltage-to-current converter that is coupled to the output terminal of the filter, the voltage-to-current converter being operable to convert the DC voltage to a current that is dependent upon the DC voltage; and
   a current-to-frequency converter that is coupled to the voltage-to-current converter, the current-to-frequency converter being operable to convert the current into a drive signal that has a frequency that is dependent upon the current.

6. The power converter of claim 5, wherein the filter is a passive filter that includes a capacitor and a resistor.

7. The power converter of claim 5, wherein the current-to-frequency converter includes a comparator.

8. The power converter of claim 5, wherein the voltage-to-current converter includes a current mirror.

9. The power converter of claim 5, wherein the voltage-to-frequency converter includes an integrated circuit.

10. The power converter of claim 1, wherein the power converter is a flyback type converter.

11. The power converter of claim 1, wherein the power converter is a forward type converter.

12. The power converter of claim 1, wherein the power converter is a double-switch forward type converter, a boost converter, or a SEPIC converter.

13. A method for use in a power converter, the power converter being operable to receive AC power from an AC power source on an input terminal and deliver DC power to a load on an output terminal, the AC power source having an input AC voltage, the method comprising:
   supplying the input AC voltage to a converter stage that includes a controllable switch that is operable to open and close in response to a drive signal, and a transformer that is coupled to the controllable switch, the switch drawing input current from the AC power source through a primary winding of the transformer when the switch is closed and interrupting the input current from the AC power source when the switch is open; and
   controlling the drive signal, wherein the drive signal switches at a frequency that is proportional to a substantially constant DC voltage dependent upon the magnitude of the input AC voltage of the AC power source, and wherein an envelope of the input current pulsed waveform of the power converter is a sinusoidal waveform that follows the AC voltage of the AC input power source.

14. The method of claim 13, wherein the controlling includes switching the drive signal at a frequency such that the RMS value of the flux density of the transformer is substantially constant for a range of magnitudes of AC voltage levels of the AC power source.

15. The method of claim 14, wherein the range of magnitudes of AC voltage levels of the AC power source is approximately between 80 and 400 volts RMS.

16. The method of claim 13, wherein the controlling includes:
   measuring the magnitude of the AC voltage of the AC power source;
   converting the magnitude of the AC voltage to a frequency that is dependent upon the magnitude of the AC voltage; and
   switching the drive signal at the frequency.

17. The method of claim 16, wherein the converting includes:
   rectifying the AC input voltage into a rectified voltage;
   filtering the rectified voltage to a substantially constant DC voltage;
   first generating a current that is dependent upon the filtered DC voltage; and
   second generating a frequency that is dependent upon the current.

18. The power converter of claim 17, wherein the filtering includes providing a capacitor and a resistor.

19. The method of claim 17, wherein the second generating includes providing a comparator.

20. The method of claim 17, wherein the converting includes providing an integrated circuit.

21. The method of claim 13, wherein the power converter is a flyback type converter.

22. The method of claim 13, wherein the power converter is a forward type converter.

23. The method of claim 13, wherein the power converter is a double-switch forward type converter, a boost converter, or a SEPIC converter.

24. A switching power converter for converting power from an AC input power source to an output at a DC output voltage, the switching power converter comprising:
- a transformer having a primary winding coupled to the AC input power source;
- an output capacitor coupled to a secondary winding of the transformer;
- a switch element coupled to the transformer, the switch drawing input current from the AC power source through the primary winding of the transformer when the switch is closed and interrupting the input current from the AC power source when the switch is open; and
- a switch control element that is operable to cycle the switch element at a frequency that is proportional to the RMS voltage of the AC input power source and at a duty cycle that relates to the difference between a reference voltage and the DC output voltage.

* * * * *